No. 736,584. PATENTED AUG. 18, 1903.
W. CORLISS.
PNEUMATIC TIRE.
APPLICATION FILED FEB. 9, 1900.
NO MODEL. 2 SHEETS—SHEET 1.
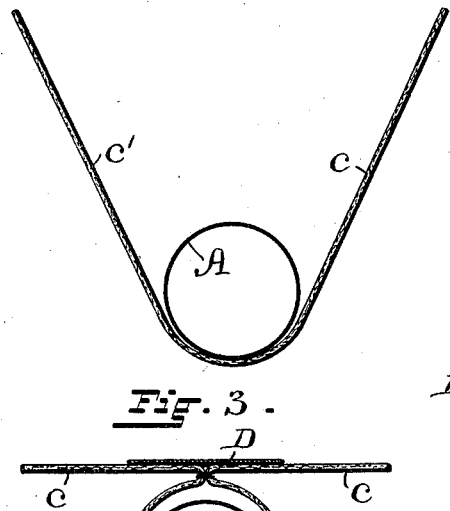
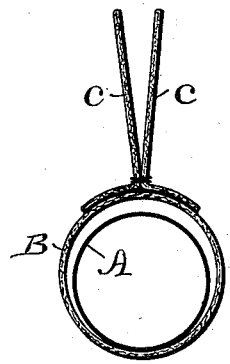
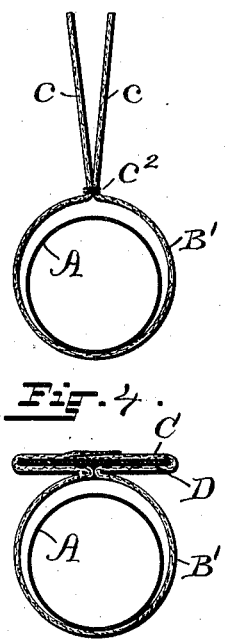
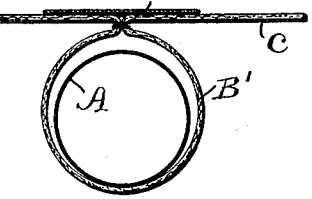
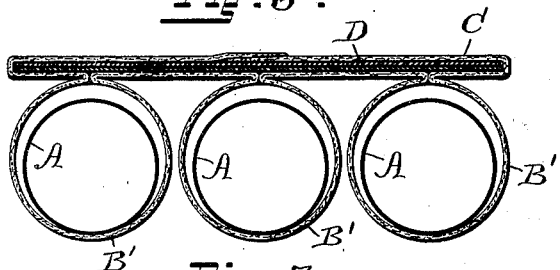
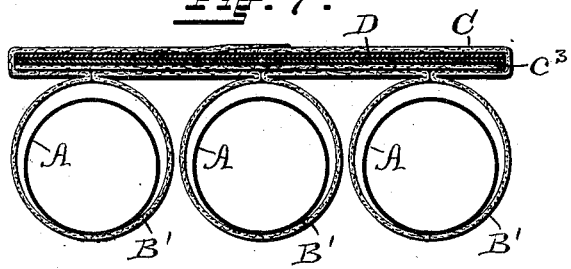
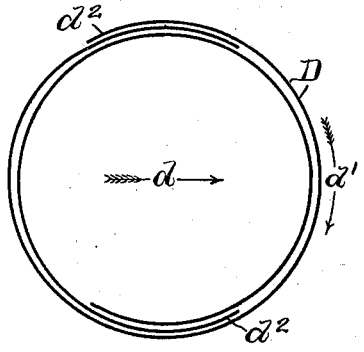
WITNESSES:
Chas. H. Luther Jr
B. M. Simms.
INVENTOR:
William Corliss
by Joseph A. Miller & Co.
Attys.

No. 736,584. PATENTED AUG. 18, 1903.
W. CORLISS.
PNEUMATIC TIRE.
APPLICATION FILED FEB. 9, 1900.
NO MODEL. 2 SHEETS—SHEET 2.
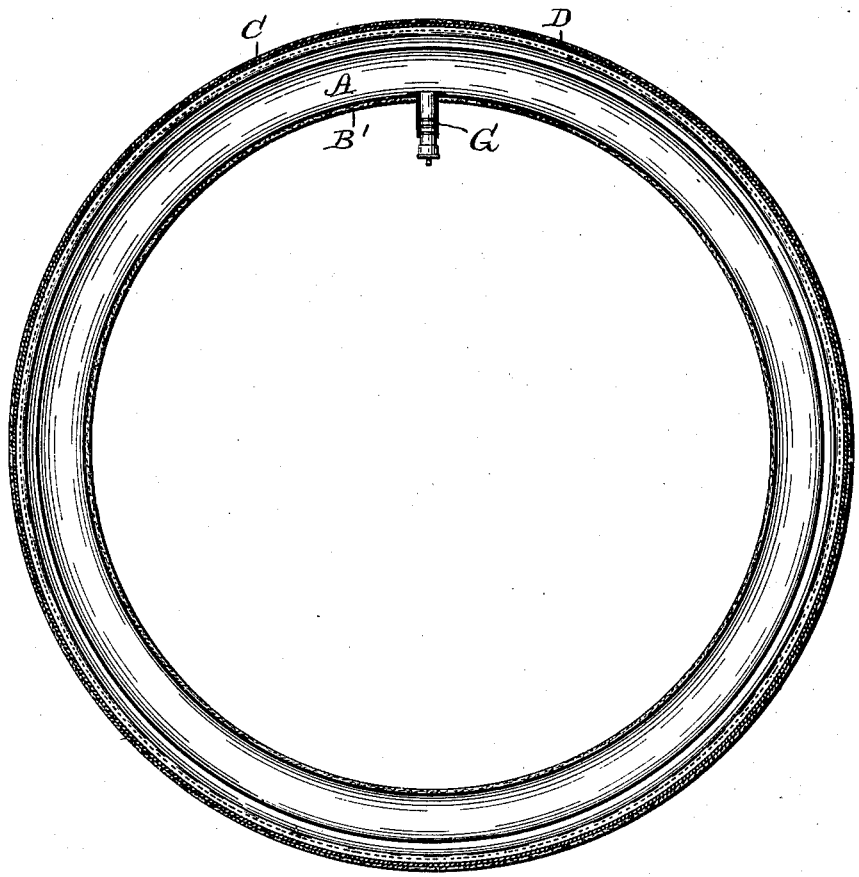
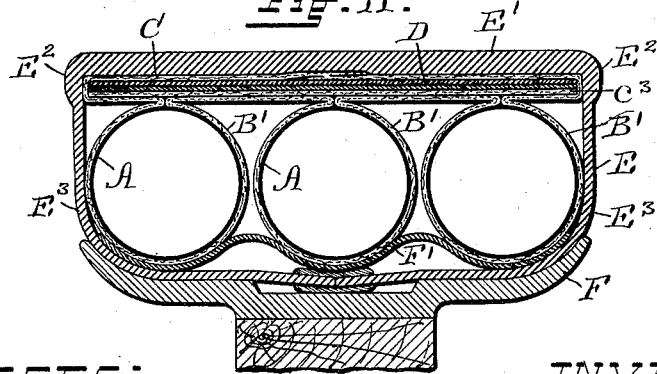
WITNESSES: INVENTOR:
Chas. H. Luther Jr. William Corliss
B. M. Simms. by Joseph A. Miller & Co.
Attys.

No. 736,584. Patented August 18, 1903.

UNITED STATES PATENT OFFICE.

WILLIAM CORLISS, OF PROVIDENCE, RHODE ISLAND.

PNEUMATIC TIRE.

SPECIFICATION forming part of Letters Patent No. 736,584, dated August 18, 1903.

Application filed February 9, 1900. Serial No. 4,641. (No model.)

*To all whom it may concern:*

Be it known that I, WILLIAM CORLISS, a citizen of the United States, residing at Providence, in the county of Providence and State of Rhode Island, have invented a new and useful Improvement in Pneumatic Tires, of which the following is a specification.

In vehicles provided with pneumatic tires the load and the vehicle are supported on the air in the tube or tubes of the pneumatic tire placed between the rims of the wheels and the road-surface. To secure the best result, the air-pressure in the tube or tubes should be sufficient to support the vehicle and its load, under normal conditions of load and road-surface, with the least possible change of form in the pneumatic tube or tubes. The material of the pneumatic tubes should be so flexible that it will readily and quickly yield to irregularities in the road-surface and to blows from the outside, as well as to the internal air-pressure. The air-pressure in the pneumatic tube should be uniform in all parts of the tube, so that in rolling the wave of compression cannot vary the air-pressure. To this end the air-tube within the pneumatic tube should be continuous. Such flexible pneumatic tubes require to be protected against puncture, but such protection should not impair the flexibility or the resiliency of the pneumatic tubes. As heretofore constructed metallic tread-bands have been secured to or within the material of the pneumatic tube, materially impairing the actions of the tube and its durability. The metallic tread-bands by which the pneumatic tube or tubes are protected against puncture should be in a perfect tire sufficiently flexible to yield freely to any local force with the pneumatic tube or tubes. The tread-band should be free to move longitudinally on and independently of the tire. The tread-band should be free to expand and contract under the varying conditions of the load and compressions of the pneumatic tube or tubes and in its best form should be of uniform cross-section to secure uniform wear and of one, two, or more separate overlapping rings to secure the desired automatic adjustment of the rings under varying conditions.

Wheel-tires, and particularly the driving-wheel tires, should have a broad flat peripheral surface in contact with the road-surface to secure more perfect adhesion of the tire on the road-surface. When pneumatic or other tires requiring a cover are used instead of the usual flexible cover, the tread portion of the cover should be molded in rubber and sufficiently vulcanized to maintain a flat tread, while the rest of the cover is flexible, so that the tread may readily yield to the load.

Practical experiments and careful tests have enabled me to ascertain the effects produced on the several parts of pneumatic tires under varying conditions, to produce a tire combining durability and resiliency with uniform elasticity, and to adapt the same to bicycles, carriages, and motor-carriages in which greater or lesser loads are supported by the tires.

One object of the invention is to provide a more resilient and more durable tire adapted to all kinds of vehicles.

Another object of the invention is to provide a tire having a broad tread supported on a series of pneumatic tubes protected by a metal tread-band, in which the tubes and tread-band are free to act independent of each other.

Another object of this invention is to provide the pneumatic tubes with a flexible sleeve containing the tread-band.

Another object of the invention is to construct the pneumatic tube so that a continuous air-tube may be placed into the same.

A further object of the invention is to provide a cover molded to form a flat tread.

The invention consists in the peculiar and novel construction and the combination of the parts, as will be more fully set forth hereinafter.

Figure 1 is a transverse sectional view of a strip of cloth and an air-tube, showing a step in the construction of my improved pneumatic tube. Fig. 2 is a transverse sectional view of the strip of cloth and the air-tube, showing the two parts of cloth secured together. Fig. 3 is a sectional view of the strip of cloth, the air-tube, and metal tread-band, illustrating the third step in the construction of my improved pneumatic tube. Fig. 4 is a transverse sectional view of the completed pneumatic tube, showing the edges of the cloth overlapping each other and secured together. Fig. 5 is a transverse sectional view of a non-elastic fabric tube to which two strips of cloth are secured to form the sleeve in which the tread-band is held against lateral movement. Fig. 6 is a transverse sectional view showing three pneumatic tubes containing air-tubes and a sleeve containing two metal tread-bands formed from one piece of cloth. Fig. 7 is a sectional view of the same parts as shown in Fig. 6, with the addition of a textile strip secured to the cloth forming the tubes by cementation or otherwise to strengthen the joints of the tubes. Fig. 8 is a plan view showing one end of the tread-bands. Fig. 9 is a side view showing the positions of the ends of the tread-bands. Fig. 10 is a sectional side view of one of the pneumatic tubes, showing the continuous air-tube, the air-valve, and the tread-band. Fig. 11 is a transverse sectional view of a complete tire adapted for heavy vehicles.

Similar marks of reference indicate corresponding parts in all the figures.

In the drawings, A indicates the air-tube, usually made of rubber. In the preferred form this air-tube is made continuous, so that in the use of the tire the air cannot bank up in the ends of the air-tube. Practical tests have demonstrated that when the air is forced by the rolling of the tire into the ends of the air-tube a lump is formed which obstructs the easy running of the wheel.

B indicates a tube, preferably made of textile material strong enough to withstand the internal air-pressure and having a considerable margin of safety to secure durability. These tubes B may be woven or braided in the tubular form as heretofore used.

C is a sleeve of textile material connected with the tube B and folded to inclose the tread-band D. When an ordinary tube is used, two strips of textile material are cemented to the tube and preferably secured together near the tube, as is shown in Fig. 5. The textile strips $c\ c$ are now folded to inclose the tread-band and the overlapping edges cemented together, as will be more fully set forth hereinafter.

The tube or tubes B in tires supporting considerable loads require to be of great strength to sustain the high internal air-pressure and should be, while non-expansible, very flexible, so as to freely yield to local obstructions and quickly resume their normal form. Tubular-woven or braided textile tubes are not, owing to the diagonal disposition of the threads, as strong as a plain-woven warp and weft fabric. It is also difficult to insert into a tubular fabric-tube a continuous air-tube. To secure great strength, durability, and economy, I have devised a method of constructing a tube or a series of tubes with the sleeve for the tread-band of plain-woven warp and weft textile fabric or cloth, and in the preferred form I place the warp longitudinal to the tube and the weft around the tube. In the construction of the single tube I take a strip of woven textile cloth $c'$ of the required width and length, place the air-tube A on the cloth, as is shown in Fig. 1, and sewing the two parts together at $c^2$ form the tube $B'$, as is shown in Fig. 2, in which the strips $c\ c$ of the cloth extend from the tube $B'$. The air-tubes A shown in these figures as partially inflated to illustrate the same more clearly may be in the collapsed condition to facilitate the sewing at $c^2$ in a sewing-machine. The strips $c\ c$ are now folded down and the metal tread-band is passed over the same, as is shown in Fig. 3. The strips of cloth are now folded over the tread-band, preferably so as to overlap, and are secured together, as is shown in Fig. 4. The tube $B'$ as thus constructed forms in itself a complete tire. It may be placed on a wheel-rim, and by pumping up the air-tube it may be used on a bicycle, forming a resilient puncture-proof tire. By placing the joint $c^2$, as shown in the drawings, on the vertical axis of the tire the flexibility of the tube is not impaired by the joint. Two, three, or more tubes $B'$ may be made out of one piece of woven cloth, canvas, duck, or other suitable textile material and provided with a sleeve in which the tread band or bands are held against lateral movement, as is shown in Fig. 6. The joints where the cloth is secured together to form the tube may be strengthened by cementing the strip $c^3$ of textile material across the same, as is shown in Fig. 7, the said strip $c^3$ extending around the tire.

When a loaded wheel provided with a pneumatic tire protected by a tread-band rolls, the portion of the tire in contact with the road-surface is compressed, the wave of compression traveling in the direction opposite to the direction in which the tire moves. In Fig. 9 the arrow $d$ indicates the direction in which the wheel moves and the arrow $d'$ the direction of the motion of the tire. The wave of compression travels in the direction opposite to the direction indicated by the arrow $d'$. The tread-band moves slowly in the direction of the wave of compression. The overlapping end $d^2$ of the tread-band moves slowly forward in the sleeve C, and to facilitate its free movement in the fabric sleeve the end $d^2$ is somewhat pointed and provided with rounded corners, as is shown in Fig. 8. To secure perfect resiliency in a tire protected by a tread-band, it must adjust itself freely to the compression of the tire, and in a tire adapted for a heavy load a series of independent overlapping rings must be used to secure this free action. A continuous spiral tread-band cannot change its normal diameter to secure the required resiliency. I form my tread-bands of one, two, or more independent overlapping strips D, preferably of steel of uniform cross-section, and in practice find that finely-powdered plumbago used as a lubricator between the plates materially aids the quick resilient action of the tire.

Covers inclosing the tire proper have heretofore been made of flexible material, and the tread portion of the covers have heretofore been covered or impregnated with rubber. For tires having a rounded tread these covers are well adapted, but for tires having a flat tread the flexible cover will not bear on the central portion and makes it difficult to properly lace the cover.

In Fig. 11 I have illustrated my improved cover. The cover E, of a flexible non-elastic material, is reinforced with rubber on the tread portion E', and at the corners $E^2 E^2$ these portions of the cover are molded and partially vulcanized to retain their form. As the molded tread E' of the tire forms a band or ring, it is held in contact throughout its width with and supported by the tread-band, while the flexible portion of the cover $E^3$ between the metal rim F and the molded corners $E^2 E^2$ freely yields to the compression of the tire without affecting the free action of the flexible fabric tube containing the air-tube A. G indicates the air-valve, which in the preferred form is secured to the continous air-tube A.

When a pneumatic or other elastic tire is used on the driving wheel or wheels of an automobile or motor-vehicle, the power is applied to the wheel and the resistance is the road-surface. The power exerted to move the vehicle exerts a strain on the material of the tire between the point where the tire is secured to the wheel and the road-bed. In the form of pneumatic tires heretofore used on motor-carriages the large diameter of the pneumatic tire and the greater compression under the load cause great strain on the material of the tire and the continual creeping of the tire on the wheel-rim. In a tire composed of a number of air-sustained tubes of small diameter the distance between the rim of the wheel and the tread of the tire is materially reduced, thereby diminishing the strain on the material of the tire.

In the construction used in my improved tire the cover E is securely clamped on both sides around the whole tire between the transversely-curved metal rim F and the transversely-curved bolster F', and when desired the bolster and the rim may be bolted together to more firmly clamp the cover.

Having thus described my invention, I claim as new and desire to secure by Letters Patent—

1. In a pneumatic tire, a non-expansible fabric tube having a sleeve, formed of textile material, flexibly connected with the fabric tube and adapted to receive and hold a tread-band tangential to the tube, as described.

2. A pneumatic tire having a non-expansible fabric tube provided with a sleeve and a metallic tread-band extending tangentially over and across the width of the tube inclosed in the sleeve, whereby the tread-band is free to move longitudinally in the sleeve and held against lateral movement on the tube, as described.

3. A pneumatic tire having the air-sustained tube provided with overlapping strips of flexible material connected with the center of the tube, whereby a metallic tread-band may be secured tangential to the tube, as described.

4. A pneumatic tire having the air-sustained tube protected against puncture by a metal tread-band extending across the width of the tube inclosed in a flexible sleeve connected with the tube at the center of the tread only, as described.

5. In a pneumatic tire, a tread-band consisting of two independent rings of sheet metal the ends of which overlap, whereby the rings may freely adapt themselves to variations in load and creep longitudinally, each independent of the other, as described.

6. A pneumatic tire having the non-expansible tube provided with a sleeve, a metallic band and a continuous and endless air-tube, whereby a uniform pressure is maintained on all parts of the air-sustained tube, as described.

7. A tube for pneumatic tires consisting of a strip of textile material jointed along the vertical axis of the tire, whereby the flexibility of the textile material on the sides of the tube is not impaired by the joint, as described.

8. A tube for pneumatic tires provided with a sleeve flexibly connected at the vertical center of the fabric tube and adapted to receive and secure the metal tread-band, formed of one sheet of textile material, as described.

9. In a pneumatic tire, the combination with the endless air-tube and the metallic tread-band, of a sheet of textile material secured together to form a tube inclosing the endless air-tube and a sleeve flexibly connected with the fabric tube inclosing the metallic tread-band, as described.

10. A pneumatic tire having two or more non-expansible air-sustaining tubes provided with a sleeve and formed of one sheet of textile material, and a metallic tread-band, as described.

11. A pneumatic tire having two or more non-expansible tubes, inclosing air-tubes, formed of one sheet of textile material, jointed to form the tubes on the vertical axis of the tubes of the tire, as described.

12. A pneumatic tire having two or more non-expansible tubes, inclosing air-tubes, formed of one sheet of textile material, jointed on the vertical axis of the tubes of the tire and strengthened by a strengthening-strip extending across the joint, as described.

13. A pneumatic tire having two or more tubes, inclosing air-tubes and a sleeve adapted to receive the tread-band, formed of a sheet of textile material, as described.

14. In a pneumatic tire, the combination with two or more non-expansible tubes and a sleeve secured to the tubes, of a tread-band, consisting of two or more strips of sheet metal forming independent overlapping rings, extending across the whole width of the tubes, as described.

15. In a pneumatic tire, a non-expansible textile tube, a sleeve of textile material flexibly connected with the upper axial center of the textile tube, and a tread-band, consisting of a strip of sheet metal, forming a ring the ends of which are obtusely pointed and overlap, said tread-band being loose in the sleeve and free to yield to varying loads, as described.

16. In a wheel-tire having a flexible metallic tread-band, a cover the transverse flat portion of which is formed of molded and vulcanized rubber, the sides being formed of flexible material, as described.

17. A cover for a pneumatic tire formed of textile material, the tread portion of which is formed in part of rubber molded and vulcanized to form a flat tread, the side portions of the cover being unvulcanized and flexible, whereby under a load the sides may yield outward and permit the free compression of the pneumatic tube, as described.

18. A pneumatic tire having two or more air-sustained tubes, a transversely flat tread-band, and a cover the tread portion of which is formed of molded and vulcanized rubber, as described.

19. A pneumatic tire having two or more non-expansible tubes side by side, an endless air-tube in each of the non-expansible tubes, a sleeve of textile material extending across the width of the tubes, and a tread-band formed of two or more independent rings of sheet metal, the ends of which overlap, as described.

20. A pneumatic wheel-tire having a transversely-curved bolster-ring, forming the support of two or more tubes, two or more non-expansible fabric tubes, air-tubes, a sleeve of textile material extending across the width of the tubes, a tread-band consisting of two or more strips of sheet metal, each strip formed into an overlapping independent ring free to move longitudinally in the sleeve, a cover the tread of which is formed in part of molded and partially-vulcanized rubber, and a metal rim transversely curved, whereby the cover is clamped between the bolster and the rim nearer the tread of the tire, as described.

In testimony whereof I have signed my name to this specification in the presence of two subscribing witnesses.

WILLIAM CORLISS.

Witnesses:
A. E. HAGERTY,
J. A. MILLER, Jr.